United States Patent [19]

Tomlinson

[11] Patent Number: 4,754,228

[45] Date of Patent: Jun. 28, 1988

[54] METHOD AND APPARATUS FOR DEMODULATING AN ANGLE MODULATED SIGNAL

[75] Inventor: Martin Tomlinson, Totnes, England

[73] Assignee: Devon County Council, Devon, England; a part interest

[21] Appl. No.: 933,049

[22] Filed: Nov. 20, 1986

[30] Foreign Application Priority Data

Nov. 20, 1985 [GB] United Kingdom ............... 8528541

[51] Int. Cl.$^4$ ............................................. H03D 3/00
[52] U.S. Cl. ................................. 329/124; 329/145; 375/39
[58] Field of Search ............... 329/110, 122, 124, 145; 375/39; 455/214

[56] References Cited

FOREIGN PATENT DOCUMENTS

| 0057007 | 4/1982 | Japan ................................ 329/122 |
| 2031671 | 8/1979 | United Kingdom . |
| 2094079 | 2/1981 | United Kingdom . |
| 2113930 | 8/1983 | United Kingdom ................ 329/124 |
| 2170368 | 1/1986 | United Kingdom . |

Primary Examiner—Eugene R. LaRoche
Assistant Examiner—Robert J. Pascal
Attorney, Agent, or Firm—Hale and Dorr

[57] ABSTRACT

In an improved demodulator, which is primarily applicable to the demodulation of angle modulated signals with a poor carrier-to-noise ratio (e.g. satellite TV signals received with a small aperture dish antenna), an intermediate frequency stage (20) is coupled to a differential phase circuit (48,50,52,54) in which delayed in-phase and quadrature components of the intermediate frequency signal are multiplied with the intermediate frequency signal itself to generate a pair of baseband differential phase quadrature signal components having a reduced noise content. These differential phase quadrature signal components are than averaged by filters (56,58) to further improve the signal to noise ratio, and then digitized and fed as digital samples to a PROM circuit (38) which performs an inverse tangent operation to derive a demodulated digital signal representative of the angle modulation $\phi$, where cos $\phi$ and sin $\phi$ are the differential phase components. Impulse noise is minimized by carrying out the differential phase and averaging operation prior to the nonlinear inverse tangent operation. The invention also includes the technique of mixing signal components which are delayed relative to each other by a time greater than or equal to 0.25/B, where B is the IF signal bandwidth, to achieve further impulse noise reduction.

25 Claims, 9 Drawing Sheets

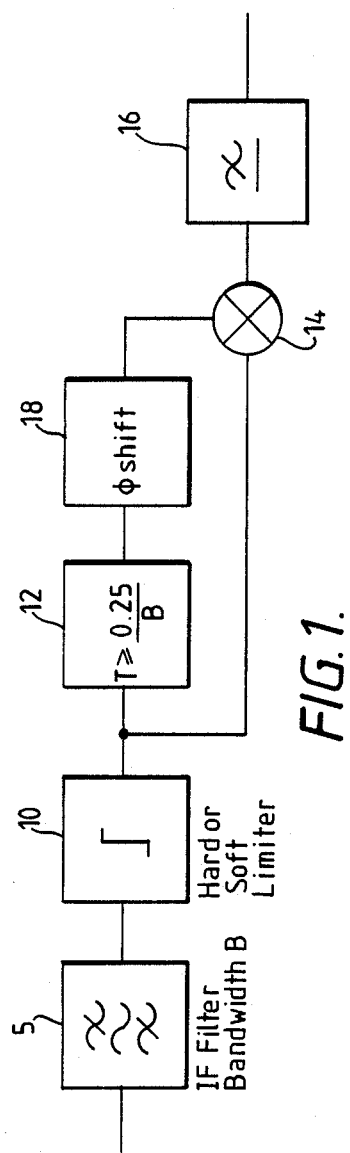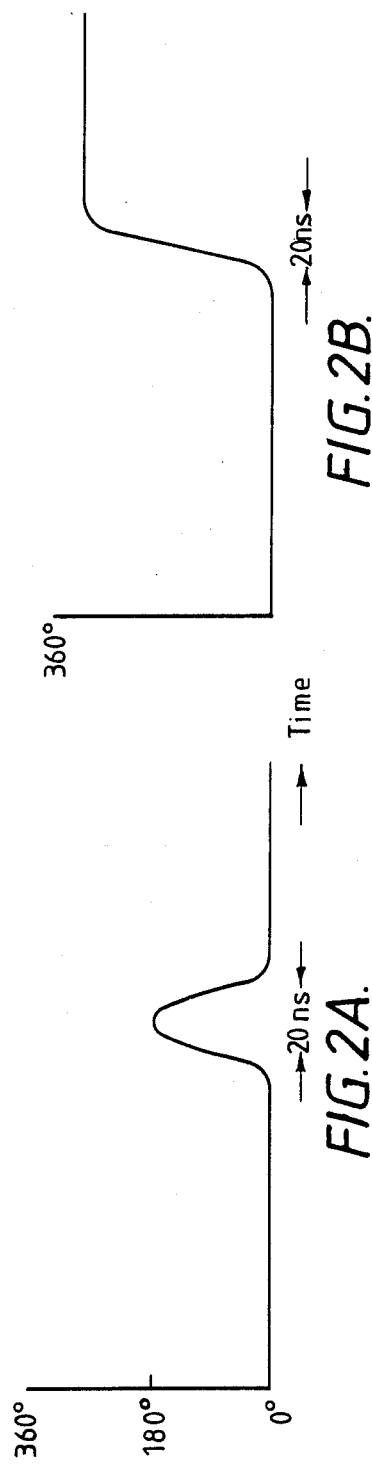

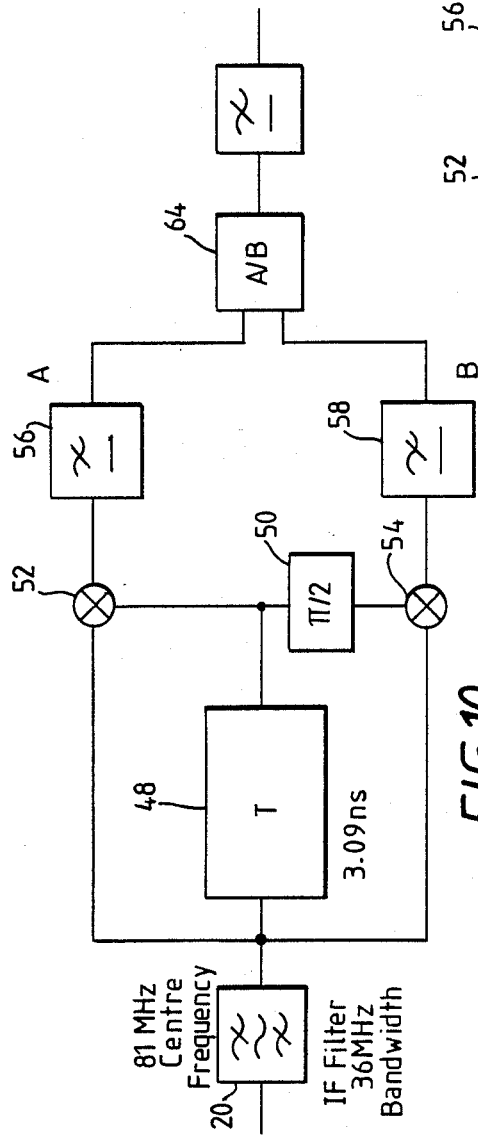
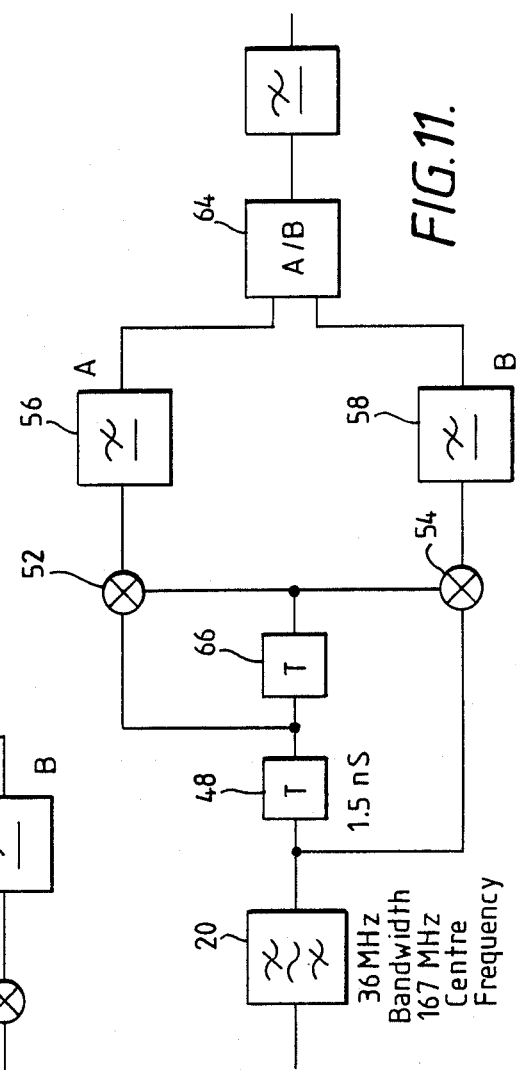
FIG.10.
FIG.11.

METHOD AND APPARATUS FOR DEMODULATING AN ANGLE MODULATED SIGNAL

BACKGROUND OF THE INVENTION

This invention relates to methods and apparatus for reducing noise breakthrough, errors or distortion in the output signal obtained from a demodulator fed with a frequency or phase modulated input signal having a comparatively low carrier-to-noise ratio. The invention is particularly applicable to the demodulation of FM television signals transmitted by satellites having for example a transmission frequency of 10 to 12 GHz and a bandwidth of 36 MHz. For economy and convenience such signals are received using small aperture dish antennas with the result that received carrier-to-noise ratios are typically as low as 2 dB to 10 dB. However, the invention is also of particular use in FM speech reception and low rate data communications as used, for example, in paging systems.

Conventional FM demodulators are often based on a delay line discriminator having a limiter in the intermediate frequency (IF) stages, a delay line coupled to the output of the limiter with delay T equivalent to a phase shift of 90° at the intermediate frequency, a multiplying device in the form of a mixer coupled to multiply the signal fed to the delay line by the signal obtained from the output of the delay line, and a low pass filter coupled to the output of the mixer. The response (output voltage versus carrier frequency $f_c$) of this discriminator when supplied with an input signal of $|A(t)|(2\pi f_c t + \phi)$ has a straight line characteristic between $f_c = f_o - \frac{1}{4}T$ and $f_c = f_o + \frac{1}{4}T$, where $f_o$ is the IF center frequency. The value of the output depends only on the value of $f_c$ and is independent of the phase constant $\phi$ and the magnitude variation $|A(t)|$, the latter being removed by the action of the limiter. At the center frequency $f_o$, the phase shift due to the delay T is $(i.2\pi + \pi/4)$ where i is an integer having any positive value (0, 1, 2, 3, etc.). In TV satellite receiving systems the value of T may be in the range 5 to 10 ns.

At low input carrier-to-noise ratios, i.e. 10 db or less, noise breakthrough is caused by input noise instantaneously being able to determine the polarity of the signal input to the limiter, causing an impulse noise spike at the output. Due to this effect, impulse noise spikes are noticeable when the input signal carrier-to-noise ratio is at or below a certain threshold.

It is an object of this invention to provide a demodulator arrangement which is less sensitive to input noise so that, in the case of a satellite receiving system, a smaller dish antenna can be used for a given received signal carrier-to-noise ratio.

SUMMARY OF THE INVENTION

According to a first aspect of this invention a demodulator arrangement for demodulating an angle modulated signal comprises: (i) an intermediate frequency stage operable to provide at an output thereof an intermediate frequency signal; (ii) a differential phase circuit including means for converting the intermediate frequency signal into quadrature components, delay means for providing delayed signal components, and, associated with the delay means, mixer means for multiplying signal components fed to the delay means with signal components outputted from the delay means, thereby to generate a quadrature pair of differential phase components in respective quadrature signal paths; (iii) means coupled in each of the signal paths for averaging each of the differential phase components; and (iv) means coupled to both signal paths for combining the differential phase components to yield a demodulated output signal.

In this way, it is possible to reduce impulse noise in the demodulated output by improving the carrier-to-noise ratio prior to significant non-linear stages in the arrangement. The main non-linear stage in the arrangement referred to above is the combining means, and carrier-to-noise ratio improvement is performed by generating differential phase components and averaging them. As mentioned above, amplitude limiting circuits are often sources of impulse noise. It follows that it is preferable to avoid significant amplitude limitation (i.e. signal chopping) prior to the averaging means.

The combining means is preferably arranged to divide one differential phase component by the other, so that, if the components are represented by sin $\phi$ and cos $\phi$, the combining means, in effect, divides one by the other to obtain tan $\phi$ and then derives the quantity $\phi$, which represents the demodulated signal. Over a limited range of $\phi$, tan $\phi$ is approximately equal to $\phi$, so that simpler embodiments of the invention may use a divider without the inverse tangent operation.

The mixer means may be a pair of mixers, each being associated with one of the quadrature signal paths, and in one embodiment of the invention they function also as down-converters, the differential phase operation taking place at IF rather than on baseband signal components.

To obtain a wide discrimination frequency range, the combining means is preferably operable over all four quadrants of the angle $\phi$. This also allows a relatively long delay to be used for the delay means, further improving the carrier-to-noise ratio for reasons to be discussed hereinafter. Preferably, digital techniques are used to achieve the four quadrant combination of the quadrature components. Each component is digitised either before or after the averaging step and fed to a programmable read-only memory (PROM) which is programmed to determine the phase angle from digital representations of the sine and cosine of the phase $\phi$ using the inverse tangent function extending over all four quadrants of the phase angle $\phi$. (An analogue discriminator can only operate over two quadrants.) In this way the maximum possible delay is doubled. Averaging components of the input signal over a few cycles in effect takes advantage of the fact that the wanted signal phase difference is largely constant over such a period whilst phase variations due to noise include higher frequency variations that change from cycle to cycle. One method of carrying out the averaging operation is first to obtain digital representations of sin $\phi$ and cos $\phi$, and then to convert the samples by crossmultiplying consecutive samples, adding and subtracting terms. This yields pairs of samples of the form $A_n A_{n+1} \cos(\phi_{n+1} - \phi_n)$, $A_n A_{n+1} \sin(\phi_{n+1} - \phi_n)$. Four, say, of each of these samples may be summed prior to carrying out the non-linear inverse tangent function (using a PROM as described above) to perform the averaging step. Alternatively, to avoid the need to carry out the conversion and averaging operations digitally at high clock rates at least equal to the bandwidth of the received signal (typically 36 MHz), an analog delay line may be used to carry out the differential phase operation at the IF, with a 90° phase shift element to perform the quadrature phase operation, and then analog low-pass filters may be used to perform the averaging operation on the converted sine and cosine signals prior to digitization. In effect, this alternative method is mathematically equivalent to the arrangement in which digitisation is carried out prior to the differential phase operation. The differential phase operation is merely carried out on bandpass signals rather than baseband signals. In the alternative method, digitisation and the subsequent inverse tangent operation may then be carried out at a much lower clock rate, typically 16 to 20 MHz, the noise content having been reduced by the analog filtering.

This hybrid analog/digital demodulator may be further simplified by relying throughout on analog circuitry whereby the advantageous long delay which is possible in the digital system is dispensed with and threshold extension is achieved primarily by the technique of averaging the signal prior to the non-linear operation. Thus, the digital inverse tangent PROM stage may be replaced by an analog divider which makes use of the fact that a phase angle expressed in radians is equal to the tangent of that angle over a limited range. This means that dividing the converted and averaged sine component by the converted and averaged cosine component results in a good approximation to the required demodulator output over a phase angle range in the order of ±20°. Yet a further simplification may be effected by replacing the 90° phase shift element with an approximate equivalent in the form of a simple delay.

The invention also includes, from a method aspect, a method of demodulating a received angle modulated signal, comprising the steps of down-converting the received signal to an intermediate frequency signal, converting the intermediate frequency signal into a quadrature pair of differential phase signal components by operations which include the multiplication or mixing of a signal representing at least a component of the intermediate frequency signal with a delayed version of the same signal, averaging the differential phase components, and combining the averaged components to produce a demodulated output signal.

It has been stated above that carrier-to-noise ratio advantages are to be gained by using a relatively long delay in a FM discriminator. This invention provides, according to a third aspect thereof, an FM demodulator arrangement comprising (i) an intermediate frequency stage arranged to provide at an output thereof an intermediate frequency signal having a bandwidth B, and (ii) a discriminator having delay means coupled to the said output and arranged to delay the intermediate frequency signal by a time which is greater than or equal to 0.25/B, a mixer stage having a first input coupled to the said output and a second input coupled to an output of the delay means, and a low-pass filter coupled to the output of the mixer stage. The delay means is preferably operable to introduce a phase shift of substantially 90° at the IF. It has been found that a delay in the region ,f 0.25/B to 1/B is particularly suitable for reducing impulse noise spikes in the demodulated output. Although impulse noise spikes do occur, they are averaged out by the choice of the unusually long value of the delay, typically 30 ns. The effect of increasing the delay is that the frequency range of the discriminator is narrowed, and with an analogue discriminator or combining means, the maximum range is ±¼T, the maximum phase variation being ±90°. The use of digital techniques doubles the frequency range by allowing phase variations of ±180°.

BRIEF DESCRIPTION OF THE DRAWINGS

The invention will be now be described by way of example with reference to the drawings in which:

FIG. 1 is a block diagram of a delay line discriminator;

FIGS. 2A and 2B are waveform diagrams of two input noise "events";

FIG. 10 is a block diagram of an analogue discriminator which is a simplification of the discriminator of FIG. 8;

FIG. 11 is a block diagram of a further simplified analogue discriminator;

DETAILED DESCRIPTION OF THE PREFERRED EMBODIMENTS

Figure 3A:
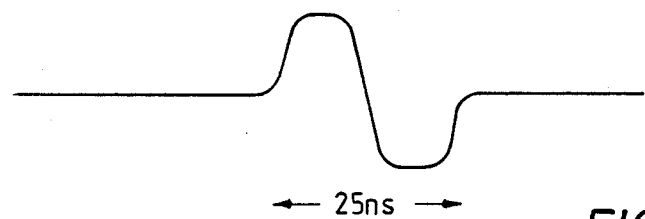
FIGS. 3A and 3B are waveform diagrams of corresponding outputs from a prior art delay line.

The following description of the invention begins with an example of a relatively simple discriminator circuit in which an intermediate frequency signal is delayed by a time greater than or equal to 0.25/B, where B is the bandwidth of the intermediate frequency signal. The circuit may form part of a receiver for satellite TV signals. This extended delay technique may be applied to more sophisticated demodulator arrangements which are described later. Referring to FIG. 1 an FM demodulator comprises an IF stage having an IF filter 5 of bandwidth B and an amplitude limiting stage 10 which is coupled to a discriminator arrangement including an analogue delay line 12, a mixer 14, and a low pass filter 16 coupled to the output of the mixer 14. A phase shift network 18 adjusts the overall phase shift between the two inputs of the mixer 14 to a value of 90° or thereabouts at the center frequency $f_o$.

Figure 3B:
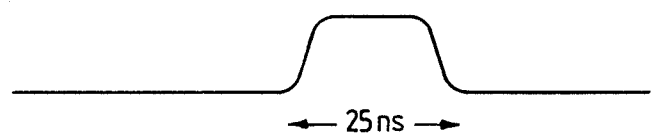

The operation of this discriminator may be explained by considering the effect of the prior art discriminator on phase events such as those shown in FIGS. 2A and 2B. Consider a constant carrier being received with a 180° phase change due to noise. The phase change would typically last 20 ns and can be of two forms as shown. Consider the output of a conventional discriminator with T equal to 5 ns. The two outputs are shown in FIG. 3A and FIG. 3B respectively. The output waveform shown in FIG. 3A has no appreciable spectral energy below 4 MHz and does not cause a visible impulse spike. In contrast, the waveform shown in FIG. 3B has appreciable spectral energy below 4 MHz and is seen as an impulse noise spike.

Figure 4A:
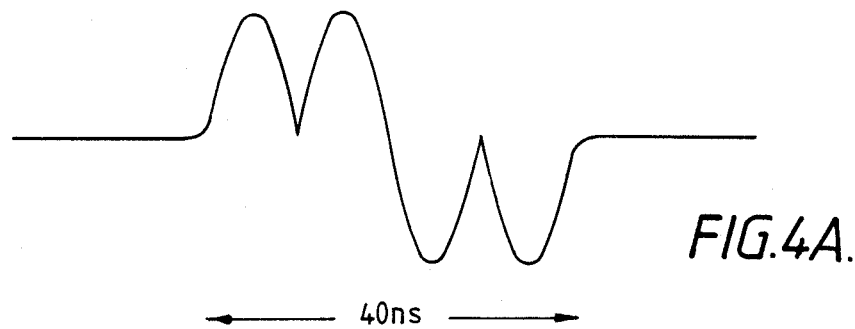
FIGS. 4A and 4B are waveform diagrams of the outputs obtained from the discriminator of FIG. 1.
Figure 4B:
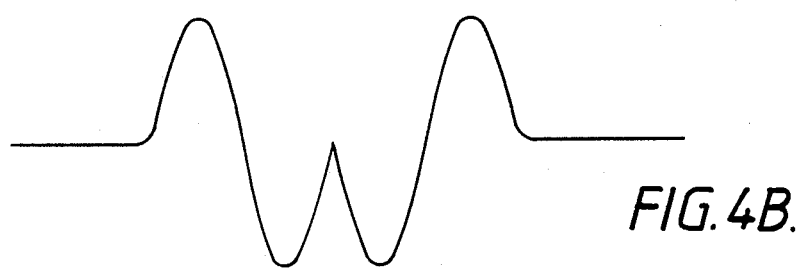

Consider now the case where T, the delay line time, is equal to 20 ns for the above input cases. The output waveforms are shown in FIG. 4A and FIG. 4B respectively. It can be seen that for either input the corresponding outputs have little low frequency spectral energy and there are no impulse spikes, thus achieving threshold extension.

Threshold extension is achieved in this method by employing a delay in the range 0.25/B to 1/B, where B is the bandwidth of the IF filter as shown in FIG. 4. The limiter may be a hard limiter of a soft limiter to obtain the additional threshold extension benefits.

The threshold extension benefits of the discriminator of FIG. 1 are limited by limitations on the value of the delay T. If T is too large then the frequency range of the discriminator may be too narrow. A shown in FIG. 3B, the range of the discriminator is $\pm \frac{1}{4}T$, which places limits on the maximum value of T. This is because the discriminator is basically limited to changes of phase of $\pm 90°$.

Figure 5:
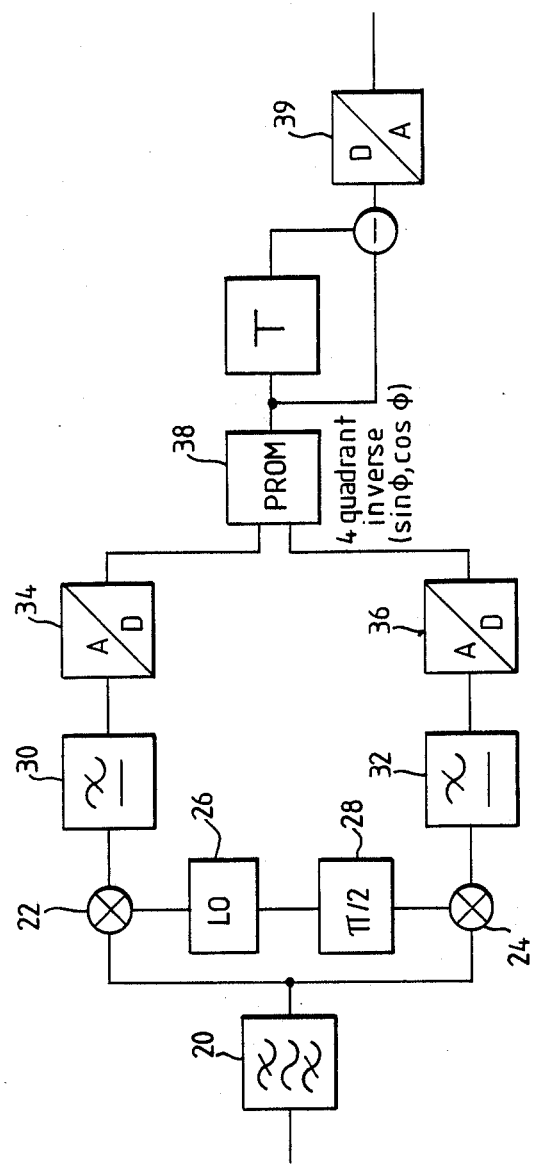
FIG. 5 is a block diagram of a digital discriminator.
Figure 6:
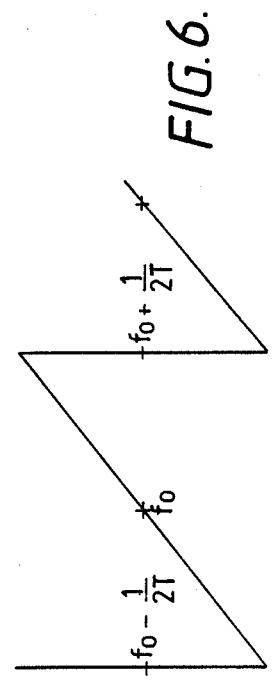
FIG. 6 is the output level versus input frequency response characteristic of the discriminator of FIG. 5.

This phase range can be extended to the fullest possible range of $\pm 80°$ by using digital techniques as shown in FIG. 5. The input signal, after filtering by the IF filter 20 is split into in-phase and quadrature components by mixers 22, 24 and phase shift networks 26, 28. These components are then filtered by low-pass filters 30,32 and digitised by A/D converters 34,36 using 6 to 10 bits resolution. Each component is now a digital representation of sin $\phi$ and cos $\phi$ respectively. The phase angle may be determined by pre-programming a Programmable Read Only Memory (PROM) 38 with an inverse tangent function extended to all four quadrants of the phase angle. The output phase sequence of the PROM 38 may be delayed by a time T and the phase difference determined as shown in FIG. 5. The discriminator that is obtained is virtually ideal and has double the bandwidth as shown in FIG. 6. In this manner long delays may be obtained.

One of the disadvantages of the digital method described above is that it is primarily a digital phase discriminator which would have a clock rate of typically 40 MHz even though the wanted signal bandwidth is less than 8 MHz typically. The alternative demodulator shown in FIG. 7 avoids these high clock rates and achieves threshold extension by improving the predetection signal-to-noise ratio (SNR) in accordance with the invention prior to the non-linear process which causes the impulse noise spikes to appear. In the delay line discriminator it is the limiter that is the non-linear process which leads to excessive impulse noise. In the digital demodulator of FIG. 5, it is the inverse function (cos $\phi$, sin $\phi$) that is the non-linear process that may cause ipulse noise. Consider the sequence of samples feeding the inverse function (cos $\phi$, sin $\phi$) PROM 38 of FIG. 5:

$(A_1 \cos \phi_1, A_1 \sin \phi_1), (A_2 \cos \phi_2, A_2 \sin \phi_2), (A_3 \cos \phi_3, A_3 \sin \phi_3).$ The terms $A_1$, $A_2$, $A_3$ are amplitude variations due to received in phase noise. (There will be phase noise associated with the terms $\phi_1$, $\phi_2$ etc. due to received quadrature noise.) The amplitude noise is suppressed in the limiters in the discriminator of FIG. 1. In FIG. 5 it is the inverse function (cos $\phi$, sin $\phi$) which basically forms the function inverse tangent of:

$$\left[ \frac{A_i \sin \phi_i}{A_i \cos \phi_i} \right]$$

and extrapolates to all four quadrants. Representing the amplitude nose term as $n_i$ and the phase noise by $\Psi_i$, the argument of the function is:

$$\frac{(S + n_i) \sin (\theta_i + \psi_i)}{(S + n_i) \cos (\theta_i + \psi_i)}$$

where S is the signal amplitude and $\theta_i$ the signal phase. (At low carrier-to-noise values $S + n_i$ has a relatively high probability of having a value=0 and causing impulse noise.) The $(S + n_i)$ terms cancel out leaving tan $(\theta_i + \Psi_i)$. The phase angles are determined and differenced to form the sequence:

$(\theta_{i+1} + \Psi_{i+1} - \theta_i - \Psi_i),$
$(\theta_{i+2} + \Psi_{i+2} - \theta_{i+1} - \Psi_{i+1}),$
$(\theta_{i+3} + \Psi_{i+3} - \theta_{i+2} - \Psi_{i+2})$ etc.

Over a short sequence of 4 to 6 values the signal phase difference is essentially common giving:

$(\theta_s + \Psi_{i+1} - \Psi_i), (\theta_s + \Psi_{i+2} - \Psi_{i+1}),$
$(\theta_s + \Psi_{i+3} - \Psi_{i+2}), (\theta_s + \Psi_{i+4} - \Psi_{i+3}).$ These values are then averaged to reduce the noise by low filtering. For example, averaging over 4 samples gives:

$$\frac{4\theta_s + \psi_{i+4} - \psi_i}{4} = \theta_s + \frac{(\psi_{i+4} - \psi_i)}{4}$$

In the absence of threshold impulse noise, the term which corresponds to noise $\Psi_{i+4} - \Psi_i$, is small, and is further reduced by a factor of 4 due to the averaging.

Threshold extension is obtained in the discriminator of FIG. 11 by changing the order of the mathematical operations so that the signal-to-noise ratio at the point where the division operation is carried out is sufficiently large that threshold events, i.e., impulse noise are rare.

Figure 7:
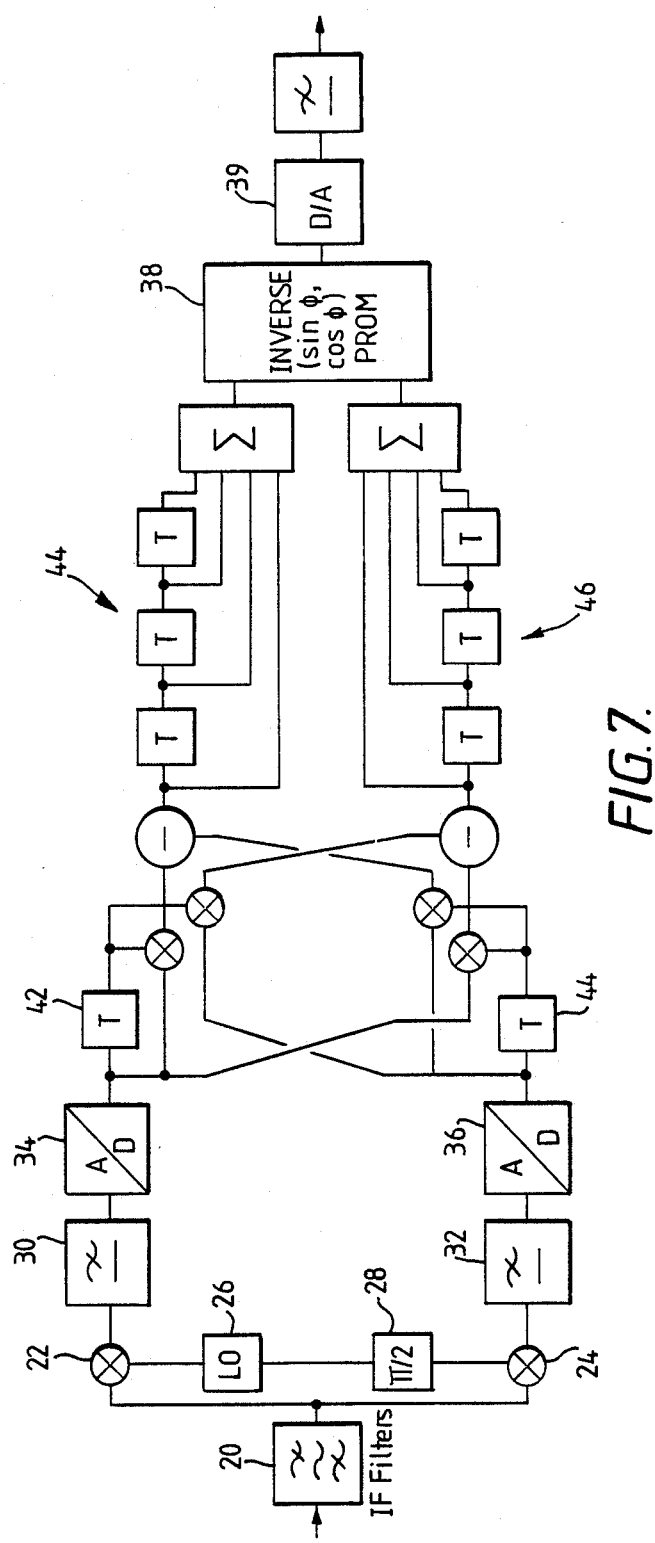
FIG. 7 is a block diagram of a further development of the digital discriminator of FIG. 5 in which an averaging process is performed on the samples to reduce the noise content before they are subjected to a non-linear operation.

Referring to FIG. 7, the filtered IF signal to split, as before, into in-phase and quadrature components, filtered and digitized. Next, consecutive digital samples of the in-phase and quadrature components produced by delay elements 42 and 44 are combined in a manner which may be represented mathematically as follows.

The sequence $\{A_1 \cos \phi_1, A_1 \sin \phi_1\}, \{A_2 \cos \phi_2, A_2 \sin \phi_2\}, \{A_3 \cos \phi_3, A_3 \sin \phi_3\} \ldots$ is converted into the sequence $\{A_1 A_2 \cos (\phi_2 - \phi_1), A_1 A_2 \sin (\phi_2 - \phi_1)\},$ $\{A_2 A_3 \cos (\phi_3 - \phi_2), A_2 A_3 \sin (\phi_3 - \phi_2)\}, \{A_3 A_4 \cos (\phi_4 - \phi_3), A_3 A_4 \sin (\phi_4 - \phi_3)\} \ldots$ by cross multiplying and adding and subtracting terms.

Using the same notation as previously, this becomes:

$\{A_1 A_2 \cos (\theta_s + \Psi_2 - \Psi_1), A_1 A_2 \sin (\theta_s + \Psi_2 - \Psi_1)\},$
$\{A_2 A_3 \cos (\theta_s + \Psi_3 - \Psi_2), A_2 A_3 \sin (\theta_s + \Psi_3 - \Psi_2)\}, \{A_3 A_4 \cos (\theta_s + \Psi_4 - \Psi_3), A_3 A_4 \sin (\theta_s + \Psi_4 - \Psi_3)\}.$ The converted components are then each delayed in a series of steps 44, 46 and 4 consecutive samples of each component summed as shown in FIG. 7 with the result that:

The cosine phasors are now added together to form an average:

$$[A_1A_2 \cos(\theta_s+\Psi_2-\Psi_1)+A_2A_3 \cos(\theta_s+\Psi_3-\Psi_2)+A_3A_4 \cos(\theta_s+\Psi_4-\Psi_3)+A_4A_5 \cos(\theta_s+\Psi_5-\Psi_4)]=(S_a+n_{ia})\cos(\theta_s+\Psi_{ia}).$$

Similarly the sine phasors are added together to form an average:

$$A_1A_2 \sin(\theta_s+\Psi_2-\Psi_1)+A_2A_3 \sin(\theta_s+\Psi_3-\Psi_2)+A_3A_4 \sin(\theta_s+\Psi_4-\Psi_3)+A_4A_5 \sin(\theta_s+\Psi_5-\Psi_4)=(S_a+n_{ia})\sin(\theta_s+\Psi_{ia}).$$

The signal-to-noise ratio, i.e.

$$\frac{S_a^2}{n_{ia}^2}$$

has been greatly improved by the averaging so that threshold events, i.e. impulse noise, become much less likely. In this example the SNR is improved by a factor of 4, i.e. 6 dB compared to the pre-detection SNR. Only at this stage is discrimination carried out by the inverse tangent process using PROM 38. It is possible to substitute digital filters for the analog low-pass averaging filters 30 and 32.

Figure 8:
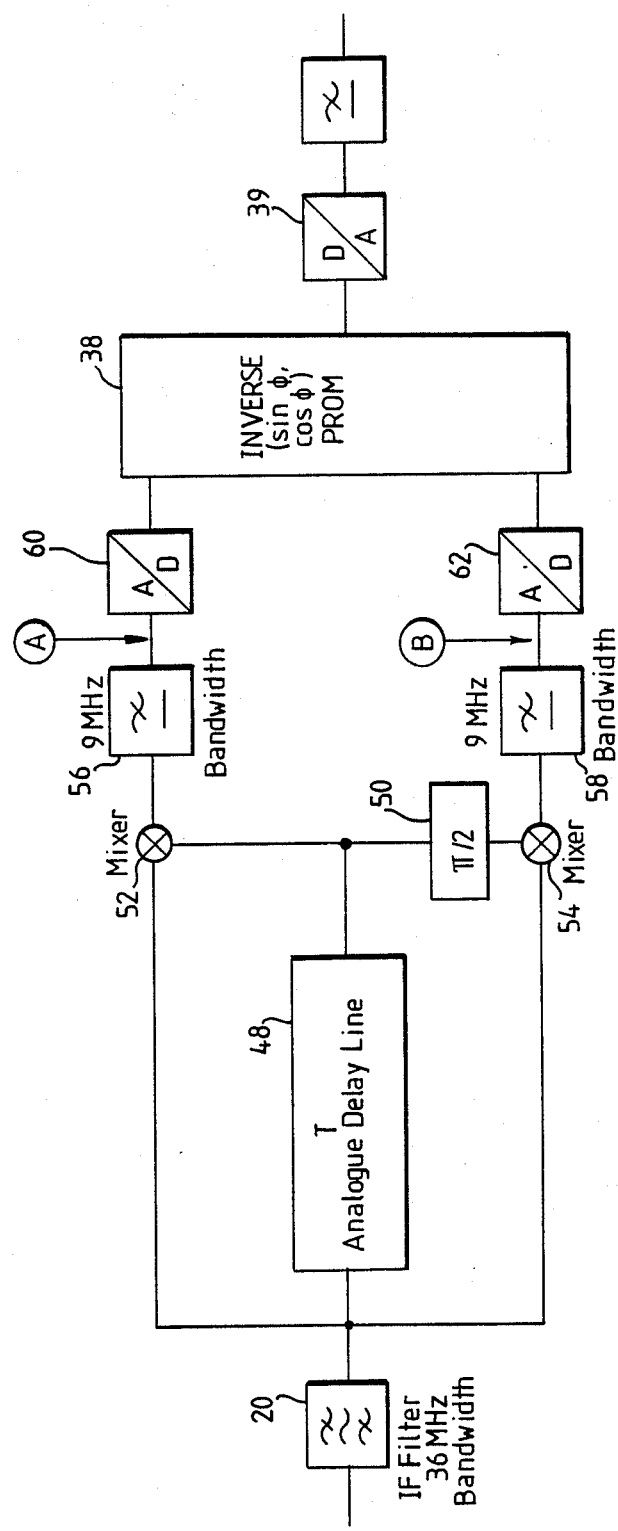
FIG. 8 is a block diagram of hybrid analogue/digital discriminator operating in an equivalent manner to that of FIG. 7.

In spite of the average technique of the above method, its implementation is comparatively expensive since the clock rate of the systems needs to be at least equal to the bandwidth of the received signal, which is typically 36 MHz in satellite TV systems. The pre-discriminator mathematical functions set out above may be carried out by analog circuitry using an analog delay line 48 as shown in FIG. 8 to carry out the differential phase operation at IF. A phase shift element 50 coupled to the output of the delay line 48 and mixers 52, 54 perform the quadrature differential phase operation. The outputs of the mixers 52, 54 are coupled to respective analog low-pass filters 56, 58 having cut-off frequency much lower than the IF bandwidth, e.g. 9 MHz, to perform the averaging operation over four to six samples. It is only here that the two signals are converted to digital form, after the bandwidth has been reduced from typically 36 MHz to 8 MHz, by A/D converters 60, 62 clocked at, typically, a 16 MHz to 20 MHz rate. The rest of the digital system clocks at this rate, PROM 38 carrying out the inverse tangent operation as before and D/A converter 39 producing the analog discriminator output signal. The analog filters 56 and 58 should, prferably, have a linear phase response.

Figure 9A:
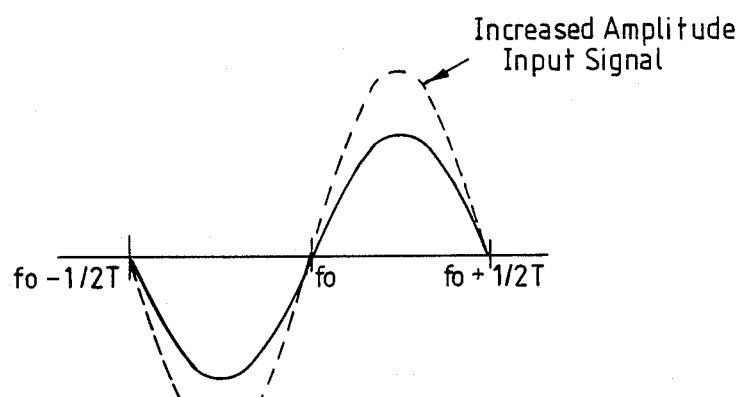
FIGS. 9A and 9B are respectively in-phase and quadrature frequency discriminator response curves taken at points (A) and (B) in the discriminator of FIG. 8.
Figure 9B:
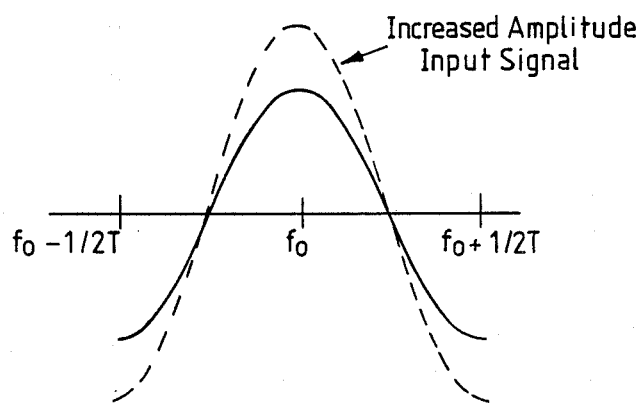

In practice there will be a delay associated with the 90° phase shift network 50 and this delay should be compensated by adding a further delay in the other quadrature branch so that the delays in the two branches are identical. Simple co-axial cable forms a good low cost delay; alternatively a Surface Acoustic Wave device could be used. The multiplying function could be carried out by double balanced mixers. The frequency discriminator responses at points (A) and points (B) are shown in FIG. 9A and FIG. 9B respectively. Notice that the system is linear at this stage and gives increased output for larger input signals.

Referring to FIG. 10, the digital part of the demodulator of FIG. 8 may be replaced by analog circuitry by virtue of an approximation. The inverse tangent of:

$$\frac{(S_a+n_{ia})\sin(\theta_s+\psi_{ia})}{(S_a+n_{ia})\cos(\theta_s+\psi_{ia})}$$

as defined above, may be approximated by using an analog divider circuit 64 to form the quantity:

$$(S_a+n_{ia})\sin(\theta_s+\Psi_{ia})\div(S_a+n_{ia})\cos(\theta_s+\Psi_{ia})$$

The divider 64 being coupled to the outputs of the low-pass filters 56, 58. In this way, instead of obtaining an output representing $\theta_s+\Psi_{ia}$, the function that is obtained is $$\frac{\sin(\theta_s+\psi_{ia})}{\cos(\theta_s+\psi_{ia})}$$

that is $\tan(\theta_s+\Psi_{ia})$. This is closely proportional to $(\theta_s+\Psi_{ia})$ over a limited range of phase angles.

For less than 2% peak to peak error the angle $(\theta_s+\Psi_{ia})$ has to be less than 20°. This requirement in turn placed a restriction on the maximum value for the delay T. For a maximum signal bandwidth of 36 MHz, the maximum value for T is 3.09 ns. The minimum center frequency, as shown in FIG. 10, is 81 MHz.

A further simplification to the circuit of FIG. 10 may be made by approximating the 90° phase shift by a simple delay 66 as shown in FIG. 11. At the divider circuit, the function is approximately:

$$\frac{\sin(\theta_s+\psi_{ia})}{\cos[2(\theta_s+\psi_{ia})]}$$

Twice the angle is obtained in the cosine branch due to the 2T delay in this branch. Provided T is sufficiently small, the function approximates to $\theta_s+\Psi_{ia}$.

Figure 14:
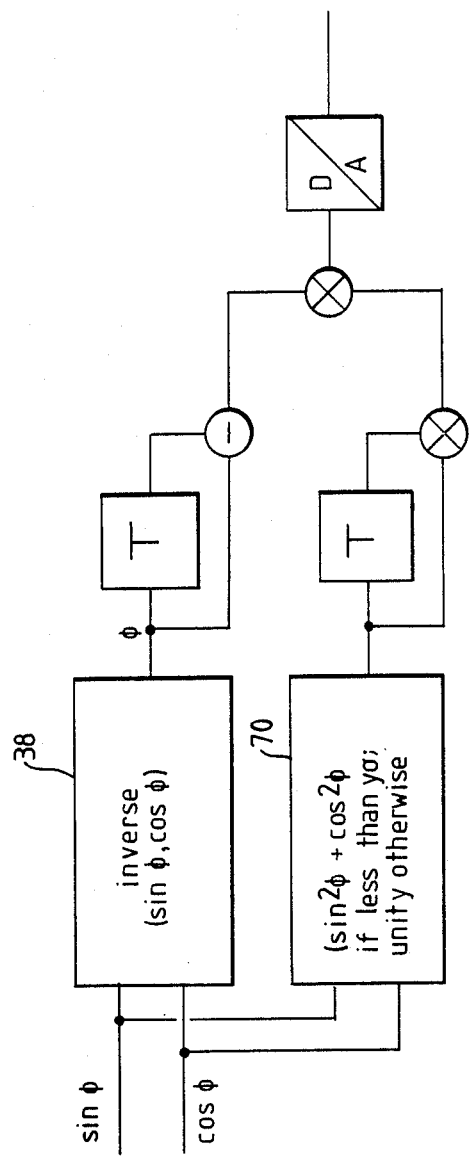
FIG. 14 is a block diagram of a digital implementation of a 'soft' limiter in the discriminator of FIG. 5.

For the peak to peak distortion to be less than 2% the total angle excursion must be less than 10°, i.e., the maximum delay is=1.5 ns. The minimum centre frequency, as shown in FIG. 14 is 166.67 MHz. A typical IF frequency in practice would be 250 MHz.

Reference has been made to a 'soft' limiter. In cases where it is necessary or desirable to include an amplitude limitation circuit in the intermediate frequency signal path; the generation of impulse noise due to the non-linearity of the limited can be considerably reduced by altering the step function amplitude (output verses input) transfer response of the conventional 'hard' limiter. In the conventional limiter in FM circuitry, almost all input voltage excursions are limited regardless of their level. In contrast, the soft limiter provides an output signal which varies in instantaneous level in proportion to the instantaneous level of the input over an appreciable portion of the input signal amplitude range and reaches a maximum for part of the time, i.e. when the instantaneous input signal level excursions exceed a certain level. The resultant response characteristic of discriminator output versus input frequency $f_c$, unlike the discontinuous response obtained at all input signal levels with the prior art "hard" limiter demodulator, has a continuous response with rounded maxima at $f_c=f_o\pm\frac{1}{4}T$ when the input magnitude $|A(t)|$ is less than $y\cdot\sigma$ where y is a constant normally in the range 1.5 to 3 and $\sigma$ is the total noise variance or power.

The received signal may be modeled modelled as $(D+n_i(t))\cos[2\pi(f_c+V_s\cdot f_n)t+\phi]+n_q(t)\sin(2\pi f_ct+\phi)$ where $n_i(t)$ and $n_q(t)$ are the in-phase and quadrature noise components respectively and:

$$|A(t)| = \sqrt{(D+n_i(t))^2 + n^2_q(t)}$$

At or below the threshold defined by $|A(t)| = y \cdot \sigma$ polarity reversals are often caused by $n_i(t) < -D$, cancelling out the wanted signal instantaneously and causing a near 180° phase shift and consequently an impulse noise spike. The action of the soft limiter ensures that the output magnitude of this noise spike is small, effectively extending the carrier-to-noise threshold to a lower carrier-to-noise ratio for a given disturbance of the demodulated output.

Figure 12:
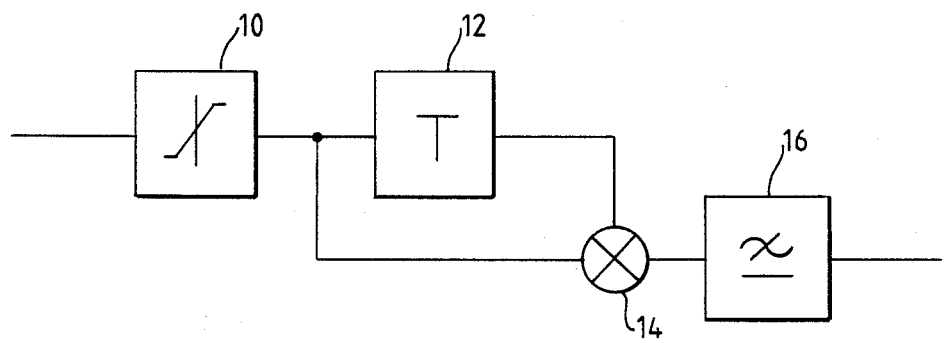
FIG. 12 is a block diagram of a delay line discriminator with a 'soft' limiter.
Figure 13:
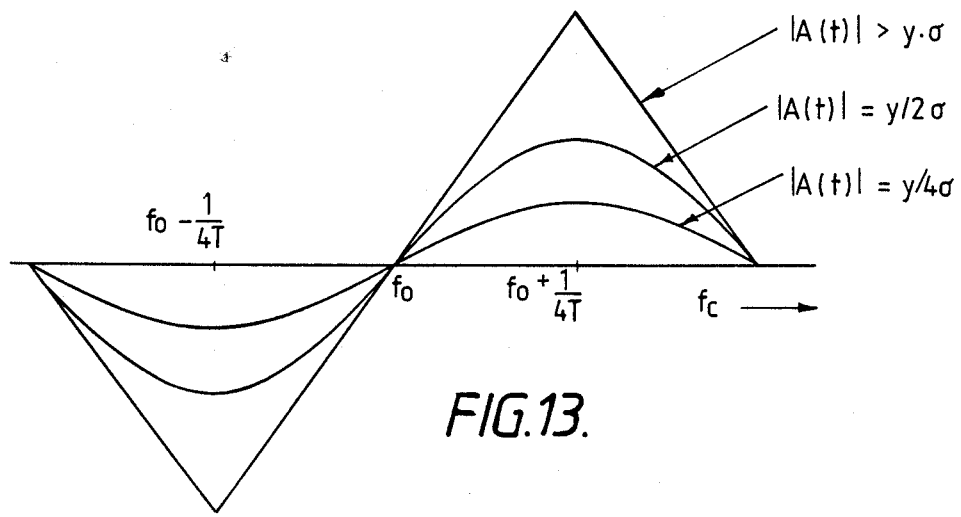
FIG. 13 is a graph showing a set of response curves for the discriminator of FIG. 12.

Referring to FIGS. 12 and 13 of the drawings, a delay line discriminator in accordance with a first aspect of the invention has a limiter 10 in the intermediate frequency stage of the receiver which has a "soft" characteristic in that signals with an amplitude magnitude $|A(t)|$ of less than $y \cdot \sigma$ are amplified in proportion to the input level, whereas as at amplitudes greater than $y \cdot \sigma$ limiting takes place to a degree depending on the extent to which $y \cdot \sigma$ is exceeded. By feeding this "soft limited" signal to a delay line 12, multiplying the delayed and undelayed signals in a mixer 14, and filtering in low-pass filter 16, an FM discriminator with a "soft" characteristic as shown in FIG. 3B is obtained. Thus, for $|A(t)|$ less than $y \cdot \sigma$ the output characteristic is approximately sinusoidally shaped with a maximum value at $f_c = f_0 + \frac{1}{4}T$ which is proportional to $|A(t)|$. With this arrangement, threshold extension is obtained because the impulse noise spike resulting at the output of the discriminator from a polarity reversal at the input due to noise is relatively small compared with the spike that would be obtained with a hard limiter.

The same soft limiting action can be introduced in the digital set-up of FIG. 5 by adding to the FIG. 5 arrangement a second PROM 70 as shown in FIG. 14 which calculates an amplitude function:

$$\sqrt{\sin^2\phi + \cos^2\phi}$$

and sets its output equal to unity if, and only if greater than $y \cdot \sigma$ in amplitude. The output of PROM 70 is delayed by a delay T and the delayed and undelayed values are multiplied together, the product then being multiplied with the calculated phase difference value as shown in FIG. 14 prior to conversion back to analog analogue form. Similar modifications may be made to the arrangements of FIGS. 7 and 8.

What is claimed is:

1. A deomdulator arrangement for demodulating an angle modulated signal, comprising: (1) an intermediate frequency stage operable to provide at an output thereof an intermediate frequency signal; (ii) a differential phase circuit coupled to the output of the intermediate frequency stage for generating from the intermediate frequency signal a quadrature pair of differential phase signal components in respective quadrature signal paths, the circuit including delay means and, associated therewith, mixer means for multiplying signal components fed to the delay means; (iii) means coupled in each of the signal paths for averaging each of the differential phase components; and (iv) means coupled to both signal paths for combining the differential phase components to yield a demodulated output signal.

2. A demodulator according to claim 1, wherein the combining means is arranged to divide one of the differential phase components by the other differential phase component.

3. A demodulator according to claim 1, wherein the mixer means comprises a pair of mixers, each mixer being associated with a respective one of the signal paths.

4. A demodulator according to claim 3, wherein the said pair of mixers function as frequency down-conversion means.

5. A demodulator according to claim 1, wherein the averaging means comprises a pair of low-pass filters each connected in a respective one of the signal paths.

6. A demodulator according to claim 5, further comprising analogue-to-digital converters coupled to the outputs of the filters to generate digital samples representing the quadrature differential phase components, and wherein the combining means comprises a digital circuit arranged to perform an inverse tangent operation on the differential phase samples to yield a series of demodulated signal samples representative of a signal $\phi$, where the differential phase components are $\sin \phi$ and $\cos \phi$.

7. A demodulator according to claim 6, wherein the combining means has an output coupled to a differentiating circuit.

8. A demodulator according to claim 1, wherein the delay means is arranged to introduce a delay greater than or equal to $0.25/B$, where B is the bandwidth of the intermediate frequency stage.

9. An arrangement according to claim 1, wherein said differential phase circuit comprises (i) first and second mixers each having one input coupled to the output of the intermediate frequency stage, and (ii) local oscillator means operable to generate a quadrature pair of local oscillator signals and connected to feed the said pair of signals to respective ones of the other inputs of the mixers, thereby to generate a pair of quadrature down-converted signal components at the outputs of the respective mixers.

10. An arrangement according to claim 9, wherein the delay means comprises a first delay stage in one of the quadrature signal paths and second delay stage in the other of the signal paths, each delay stage having its input and its output coupled to a mixer for the purpose of providing a differential phase component.

11. A satellite signal receiver comprising a demodulator arrangement for demodulating an angle modulated signal, comprising: (1) an intermediate frequency stage operable to provide at an output thereof an intermediate frequency signal; (ii) a differential phase circuit coupled to the output of the intermediate frequency stage for generating from the intermediate frequency signal a quadrature pair of differential phase signal components in respective quadrature signal paths the circuit including delay means and, associated therewith, mixer means for multplying signal components fed to the delay means; (iii) means coupled in each of the signal paths for averaging each of the differential phase components; and (iv) means coupled to both signal paths for combining the differential phase components to yield a demodulated output signal.

12. A demodulator arrangement for demodulating an angle modulated signal, comprising a substantially non-limiting intermediate frequency stage which is operable to produce at an output thereof an intermediate frequency signal corresponding to a received radio frequency signal, differential mixing and converter means coupled to the said output for converting the intermediate frequency signal into quadrature differential sine and cosine signal components, averaging means coupled to said differential mixing and converter means for averaging each of the said signal components, and means for combining the averaged signal components to yield a demodulated output signal $\phi$.

13. An arrangement according to claim 12, wherein the combining means comprises a circuit for dividing one of the said signal components by the other of the said signal components.

14. An arrangement according to claim 12, further comprising analogue-to-digital converter means for converting the sine and cosine signal components into digital form, and wherein the combining means comprises a circuit for deriving a digital representation of the demodulated output signal $\phi$ by performing an inverse tangent operation on samples of sine and cosine components $\sin \phi$ and $\cos \phi$.

15. An arrangement according to claim 12, wherein the averaging means includes respective low-pass filters for filtering the said sine and cosine signal components.

16. An arrangement according to claim 14, wherein the averaging means comprises a digital cross-multiplying and summing arrangement operable to receive digital signal samples representative of the sine and cosine components, to multiply consecutive samples of both components thereby providing a series of modified sine and cosine samples, and to sum a predetermined number of both the modified sine and cosine samples to produce an averaged digital sine component and an averaged digital cosine component.

17. A demodulator arrangement for demodulating an angle modulated signal, comprising (i) an intermediate frequency stage arranged to provide at an output thereof an intermediate frequency signal having a bandwidth B, and (ii) a discriminator having delay means coupled to the said output and arranged to delay the intermediate frequency signal by a time which is greater than or equal to 0.25/B, a mixer stage having a first input coupled to the said output and a second input coupled to an output of the delay means, and a low-pass filter coupled to the output of the mixer stage.

18. An arrangement according to claim 17, wherein the delay means is operable to introdue a phase shift of substantially 90° at the intermediate frequency.

19. A method of demodulating a received angle modulated signal, comprising the steps of down-converting the received signal to an intermediate frequency signal, converting the intermediate frequency signal into a quadrature pair of differential phase signal components by operations which include the multiplication or mixing of a signal representing at least a component of the intermediate frequency signal with a delayed version of the same signal, averaging the differential phase components, and combining the averaged components to produce a demodulated output signal.

20. A method according to claim 19, wherein the passage of the signals and signal components representative of the received signal is substantially free of amplitude limiting processes.

21. A method according to claim 19, wherein the signals which are multiplied or mixed with each other are delayed with respect to each other by a time interval greater than or equal to 0.25/B, where B is the bandwidth of the intermediate frequency signal prior to conversion into differential phase components.

22. A method according to claim 19, wherein the averaged differential phase components are present in the form of digital samples, and wherein the samples are combined in an inverse tangent operation t yield a series of demodulated signal samples representative of a signal $\phi$, where the differential phase components are proportional to $\sin \phi$ and $\cos \phi$.

23. A method according to claim 22, wherein the generation of the differential phase components includes splitting the intermediate frequency signal into a pair of quadrature components by analog means, and wherein the averaging of the differential phase components is performed by analog filters.

24. A method according to claim 22, wherein the down-conversion of the intermediate frequency signal to performed at the same time as the generation of the quadrature differential phase components by means of two mixers coupled to a delay element and a 90° phase shift network.

25. A method according to claim 22, wherein the intermediate frequency signal is down-converted to a pair of quadrature baseband signal components by means of a pair of mixers coupled to receive a quadrature pair of local oscillator signals, wherein the baseband components are converted to digital samples which are then subjected to delaying, multiplying, cross-multiplying and subtracting operations to derive the differential phase components, and wherein the differential phase components are individually averaged by the summing of groups of samples prior to the combining step.

* * * * *

UNITED STATES PATENT AND TRADEMARK OFFICE
CERTIFICATE OF CORRECTION

PATENT NO. : 4,754,228            Page 1 of 2
DATED     : June 28, 1988
INVENTOR(S) : Martin Tomlinson It is certified that error appears in the above—identified patent and that said Letters Patent is hereby corrected as shown below:

Column 3, line 59, ",f" should be --of--.

Column 5, line 16, "of" should be --or--.

Column 5, line 27, "±80°" should be --±180°--.

Column 6, line 9, "nose" should be --noise--.

Column 6, line 48, "to" should be --is--. (2nd occurrence)

Column 7, line 8, "nia" should be --$n_{ia}$--.

Column 8, line 47, ";" should be --,--.

Column 8, line 66, "σ" should be --$\sigma^2$--.

Column 8, line 67, delete "modeled" (first instance).

Column 9, line 3, "$=\sqrt{(D+n_i(t))^2 + n^2_q(t)}$" should be --$=\sqrt{(D+n_i(t))^2 + n^2_q(t)}$--.

Column 9, line 52, Claim 1, "deomdulator" should be --demodulator--.

UNITED STATES PATENT AND TRADEMARK OFFICE
CERTIFICATE OF CORRECTION

PATENT NO. : 4,754,228

DATED : June 28, 1988

INVENTOR(S) : Martin Tomlinson

It is certified that error appears in the above—identified patent and that said Letters Patent is hereby corrected as shown below:

Column 8, line 42, "FIG. 14" should be --FIG. 11--.

Column 8, line 48, "limited" should be --limiter--.

Column 8, end of line 68, "$(2\pi f_{ct}+\phi)$" should be --$(2\pi f_c t+\phi))$--.

Column 12, line 21, "t" should be --to--.

Column 12, line 33, "to" should be --is--.

Signed and Sealed this

Thirteenth Day of June, 1989

Attest:

DONALD J. QUIGG

*Attesting Officer*     *Commissioner of Patents and Trademarks*